Figure 1:
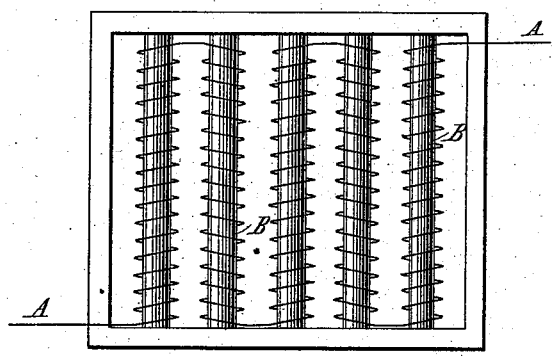

(No Model.)

E. WESTON.
ELECTRICAL COIL AND CONDUCTOR.

No. 381,305. Patented Apr. 17, 1888.

WITNESSES:
Raymond F. Barnes
J. Daniel Compton

INVENTOR
Edward Weston
BY
Paul W. Page
ATTORNEY

UNITED STATES PATENT OFFICE.

EDWARD WESTON, OF NEWARK, NEW JERSEY.

ELECTRICAL COIL AND CONDUCTOR.

SPECIFICATION forming part of Letters Patent No. 381,305, dated April 17, 1888.

Application filed October 13, 1885. Renewed June 18, 1886. Again renewed December 14, 1887. Serial No. 257,906. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Coils and Conductors, of which the following is a specification, reference being had to the drawings accompanying and forming a part of the same.

There are a great many electrical devices containing long lengths of conductor, usually in the form of coils or in convolutions, through which in the use or application of the instrument the current is passed, and in which it is desirable, and often extremely important, to preserve a constant or uniform resistance. This is frequently a matter of the greatest difficulty, inasmuch as a strong current is apt to raise the temperature of the conductor, which, with all conductors heretofore used, operates to increase its resistance. In fact, the resistance of all such instruments varies with the temperature of the coils or conductors, to whatever cause such variation in temperature may be due. Among the instruments which are injuriously affected by this property of conductors may be mentioned rheostats, artificial resistances, regulators, electrical meters, indicators, or testing-instruments generally which are connected with a circuit or a branch thereof for determining the strength of a current or the potential at any point in a circuit. It is evident that a remedy for this is extremely desirable, as it would add greatly to the value and efficiency of every instrument to which it is applied. I am enabled to provide this remedy by availing myself of the discoveries which I have made that the metal manganese imparts a very high electrical resistance to alloys into which it enters as a constituent, and has the further remarkable property of rendering the electrical resistance of such alloys nearly or quite constant under varying conditions of temperature. I therefore make the coils or conductors of electrical measuring-instruments of a metallic alloy containing manganese. An alloy of manganese with copper produces a conductor which is of great excellence for my purpose. This alloy is made by the common process of melting the two metals; but in practice I prefer to employ ferro-manganese on account of its greater cheapness, and this I use in the proportions of copper, seventy parts; ferro-manganese, thirty parts, or thereabout. This alloy is capable of being rolled and drawn, and is made up into wire in the usual way. This wire I use either bare or covered in making the coils or helices of the instruments above referred to.

In the drawings I have shown various forms of coil to which the invention is advantageously applied.

Figure 2:
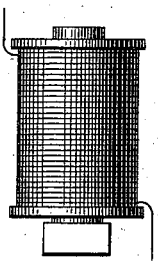
Figure 3:
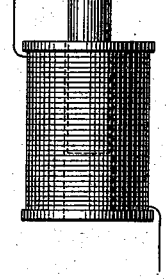
Figure 4:
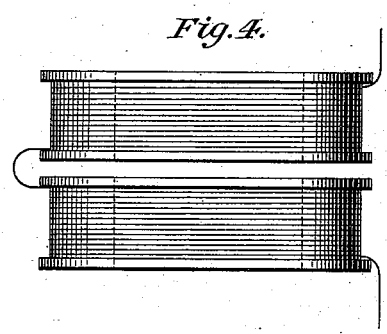

Figure 1 is a common form of artificial resistance, consisting of a bare wire, A, wound on insulating-rods B. This wire, when made of copper and manganese or its equivalent, does not vary in electrical resistance, however much it may become heated from the passage of the current, or from other sources. Fig. 2 is an ordinary form of electro-magnet, such as might be used in a regulator; Fig. 3, an ordinary form of helix and core, typical of the many forms of electro-magnet used in indicators, meters, and the like. Fig. 4 is a set of coils such as appear in galvanometers.

In all these cases, by making the coils of the alloy above described, the result of constant resistance for varying temperatures is obtained, whereby much labor in adjustment and computation may be saved in the practical use of the instrument. The exact proportions of the metals used may vary somewhat; but while I have found that the addition of manganese or ferro-manganese in any proportion to copper is an advantage, so far as preserving a constant resistance is concerned, I find that the best results are obtained by the use of about seventy parts of copper to thirty of ferro-manganese. This alloy as a new composition of matter I do not claim herein, having made the same subject of another application of even date herewith; but inasmuch as it possesses peculiar and unforeseen advantages in the construction or composition of the instruments herein enumerated I now claim it as applied to such.

What I claim is—

1. A coil or conductor wound in convolutions composed of an alloy of manganese and copper or its equivalent.

2. A coil or conductor wound in convolutions composed of copper and ferro-manganese, in the proportions of seventy parts of copper and thirty parts of ferro-manganese.

3. A rheostat, resistance, or other electrical instrument of the kinds herein described, the coils or conductors of which are composed of an alloy of copper and manganese or its equivalent.

EDWARD WESTON.

Witnesses:
RICHARD WM. BLOEMEKE,
FRANK N. CRANE.